Jan. 28, 1958     E. SCHLUETER     2,820,995
SPRING LOADED LINK LOCK FASTENER
Filed Oct. 4, 1955     2 Sheets-Sheet 1
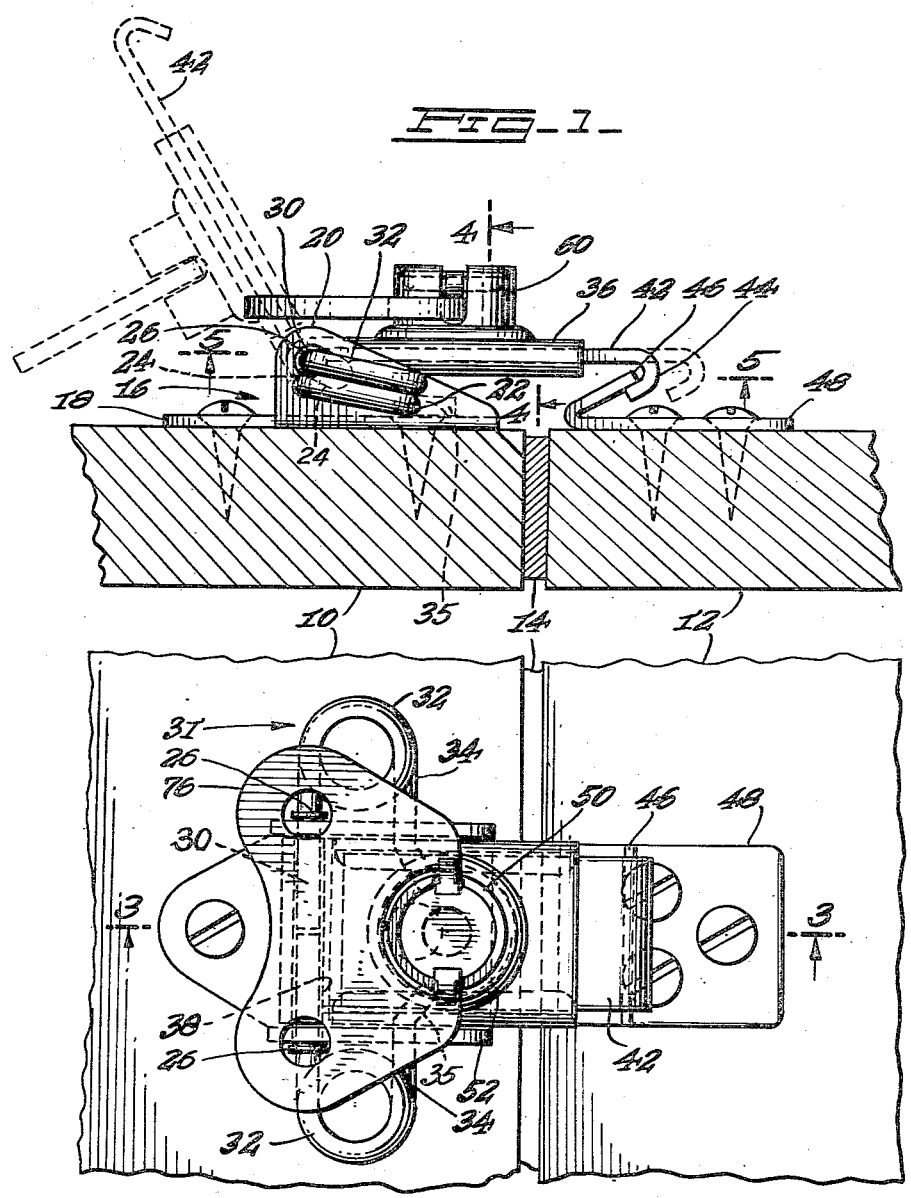
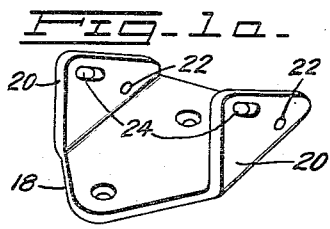
INVENTOR.
ERNEST SCHLUETER
BY
H. M. Kilpatrick
ATTORNEY.

Jan. 28, 1958     E. SCHLUETER     2,820,995
SPRING LOADED LINK LOCK FASTENER
Filed Oct. 4, 1955     2 Sheets-Sheet 2
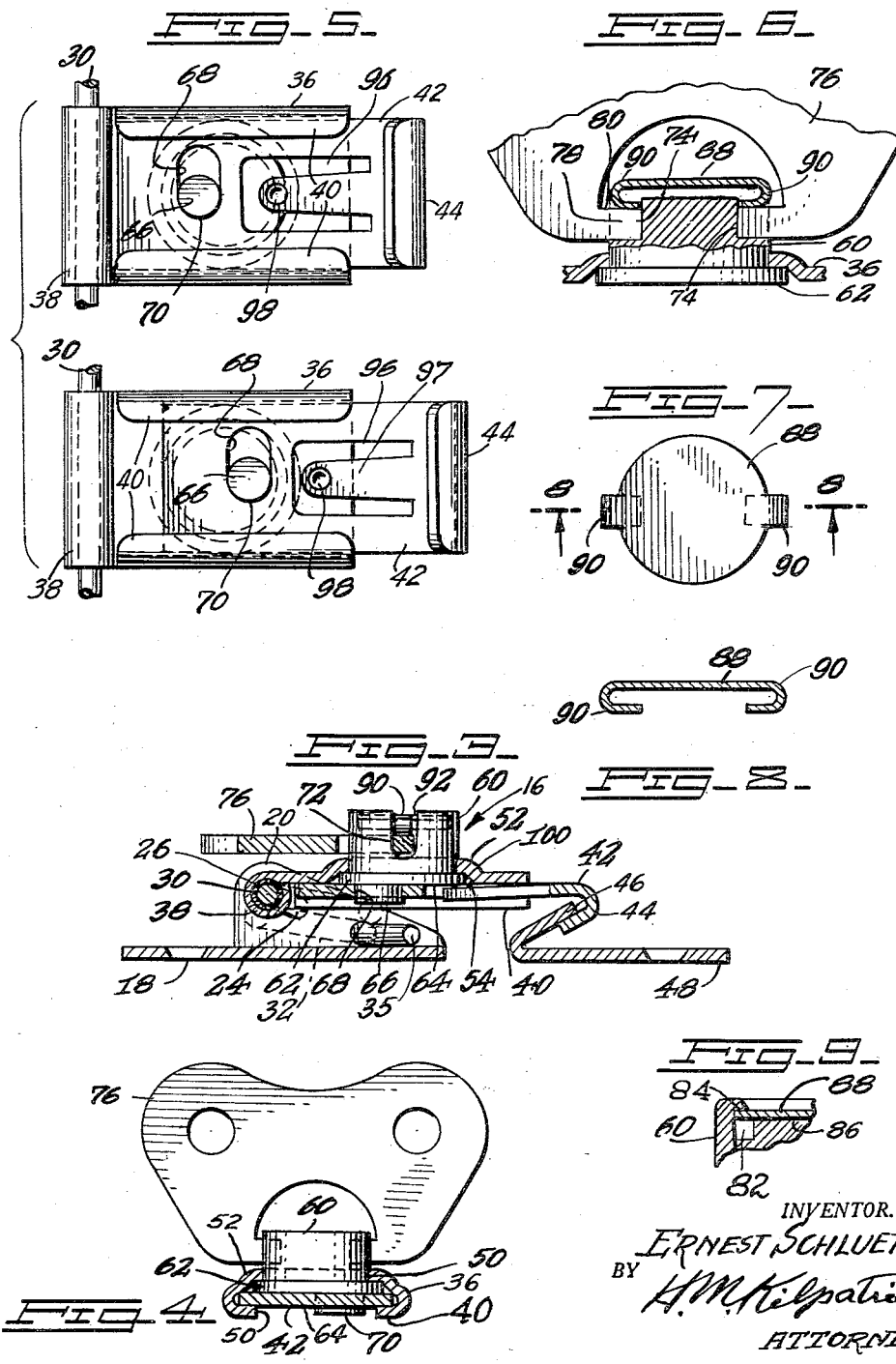
INVENTOR.
ERNEST SCHLUETER
BY H. M. Kilpatrick
ATTORNEY.

United States Patent Office 2,820,995
Patented Jan. 28, 1958

2,820,995

SPRING LOADED LINK LOCK FASTENER

Ernest Schlueter, Troy, N. Y.

Application October 4, 1955, Serial No. 538,297

10 Claims. (Cl. 20—92)

This invention relates to fastening devices and to fasteners for securing together adjacent structures and more particularly to fasteners for locking or fastening together adjacent panels of portable houses, large packing cases, trunks and the like, though it is noted that in some of the claims the invention is not limited to securing panels.

Objects of the invention are to provide an improved spring loaded fastening device of this kind which will forcibly yieldably draw the two structures together and insure a close fit regardless of imperfections of fit, warping, misalinement or the like, and to provide a relatively small very strong loading means to insure such close fit.

Other objects of the invention are to provide improved operating and manipulating devices for the fastener.

Additional objects of the invention are to effect simplicity and efficiency in such fasteners and to provide an extremely simple fastener of this kind which is durable, reliable and quick in operation, and economical to manufacture.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with an improved spring-loaded fastener which briefly stated, includes a bracket adapted to be secured to one of the structures and carrying a pair of ears having alined apertures and upwardly backwardly inclined slots receiving a loading spring rod having spring end parts disposed in the apertures.

Pivoted on said rod is an outer hasp member in which slides an inner slide member having a hook adapted to catch on a keeper on the other structure. Said hasp member has a hole therethrough rotatably receiving a bolt having an inner flat face engaging the inner member. Means carried by said outer member and the bolt serve for drawing the members together to a locking position. The slant of said slots is such that the pull of the keeper when the fastener is fastened is greater than the force tending to flex the spring rod.

A butterfly pivoted on the bolt is movable to raised or lowered position held in place by spring arms of a metal disk held in place by an undercut annular shoulder on the bolt.

In the accompanying drawing showing, by way of example, one of many possible embodiments of the invention, Fig. 1 is a plan of the fastener holding together two panel members shown in section;

Fig. 1a is a perspective view of the bracket having the slotted ears;

Fig. 2 is a fragmental front elevation of the structure of Fig. 1;

Fig. 3 shows a section of the fastener on the line 3—3 of Fig. 2;

Fig. 4 is an enlarged transverse sectional view of the fastener showing the butterfly in operating position;

Fig. 5 shows two bottom or inner views of the hasp and slide members in locked and unlocked relative position;

Fig. 6 is an enlarged fragmental view showing part of the butterfly in elevation in raised operating position;

Figs. 7 and 8 are respectively plan and diametric sectional views of the butterfly holding means; and Fig. 9 is a fragmental sectional view showing the holding means and undercut shoulder.

My improved fastener is shown in combination with a pair of thick panels 10, 12 in the same plane, meeting in a butt-joint having butt faces perpendicular to said plane and having a gasket 14 compressed therebetween.

The fastener includes a sheet metal pivot bracket 16 having a flat base plate 18 secured by screws fast to a face of one panel and having parallel upturned triangular side ears 20 of the same shape having an acute angle pointing toward said butt faces and having alined apertures 22 near the front corner axially parallel to said butt faces and inclined slots 24 (Fig. 3) radial to said apertures and extending with a downward slant of about 40° to said base from near the upper corners toward said apertures. The slots 24 may be inclined at an angle between 30° and 50° to the panel.

A sleeve or bushing 26 disposed normally in the upper part of said slots 24 transversely of the ears receives the upper parts 30 of a pair of spring wire pivot members 31, each having an upper part extending substantially to the middle of the sleeve, and having a projecting part 32 exterior to the space between the ears and curved in, at least, one partial or complete convolution and having an inwardly extending lower part 34 extending inwardly through said apertures 22 and having its free inner end parts 35 disposed in the space between the ears and bent at an angle to hold said upper and lower parts against outer movement from said sleeve and apertures. Said spring members 31 and sleeve 26 constitute a loading spring member, the two upper parts 30 and the sleeve 26 constituting a loading spring main pivot rod.

A substantially flat hasp member 36 having a main pivot end part between said ears is curved loosely or fast over and under the sleeve 26, as at 38, from ear to ear to form a pivoted connection whereby the hasp may be swung to positions substantially parallel, or perpendicular to or at angles to the panel and moved to lie across said gasket 14 or remote therefrom. Said hasp member 36 is provided with side edge flanges 40 turned toward the panel and plate and inwardly toward each other to form guide ways extending toward the joint and receiving a flat slide plate member 42 having its side edges slidable in said guide ways. Said slide plate member 42 has a projecting end portion projecting across said joint and bent toward the panel and slightly toward said joint to form to wide hook 44 engageable with a keeper lip 46 of an approximately rectangular keeper plate 48 mounted on the other panel 12 and having its margin nearest said hasp member inclined in a direction away from the panels and hasp member to form said keeper lip 46 wherby said wide hook 44 may engage the lip when the slide member 42 telescopes to an inner locking position in said guide ways, to draw said butt faces together against the gasket 14, and whereby said hook may clear the lip when the slide member moves to an outer unlocking position in said guide ways.

The mid part of said hasp member (Figs. 2 and 4) is provided midway between the guide ways with a large opening 50 surrounded by an upwardly pressed boss 52 forming an inner annular groove 54 (Fig. 3) around the opening.

An eccentric-carrying bolt 60 rotatably fitting in the round opening has an enlarged diameter inner end forming a lateral flange 62 in said groove 54 and having a flat end face 64 perpendicular to its axis and substantially flush with the inner face of the hasp member 36 and engaging on said slide member. An eccentric pin 66 fast in said bolt and projecting from said flat end face engages in a transverse slot 68 (Figs. 3 and 5) in said slide member, engaging in one end 70 of the transverse slot when the slide member is in locking and unlocking positions, and in the other end when the slide member is in an intermediate position.

Said pin when in locking position is a little beyond the dead center, whereby pull on the slide member holds the pin at the end 70 of the slot.

Said bolt has axially alined bores 72 (Fig. 3) diametric of the bolt at diametrically opposite sides of the upper end of the bolt, in which are pivotally received inturned pivot journals 74 (Fig. 6) of a butterfly 76 whereby the butterfly may be disposed in raised operating position diametrically of the bolt, thus adapting the bolt to be turned by hand or may lie substantially flat against said ears 20 of the pivot bracket. Said pivot journals 74 are square in cross section providing side faces 78, 80 parallel and perpendicular to the plane of the butterfly.

The outer end face of the bolt head is provided with a deep marginal annular groove 82 therearound forming a thin outer wall of the groove at the periphery of said face, said wall being inwardly projected to form an undercut shoulder 84 (Fig. 9) in the groove. The intramarginal part 86 of said end face is inwardly off-set from said shoulder to form a circular recess which receives a disk-shaped spring 88 in said recess and groove and anchored under said shoulder 84 and having peripherally projecting tabs 90 projecting radially outwardly through the open upper part 92 of the bores and then curved downwardly and inwardly and pressing against said journals and side faces 78, 80 thereof to yieldably hold the butterfly in said raised position or in lying position.

Said slide member is axially provided with a U-shaped cut 96 (Fig. 5) having its yoke part adjacent to said opening of the member and forming a tongue 97 provided with a protuberance 98 engageable with said flat face of the bolt; said flat end face 64 of the bolt has a recess 100 near its periphery receiving said protuberance when the bolt is in locking position to yieldably stop the bolt in said position.

Said bushing 26 and spring members 31 (Fig. 1) yieldably hold the panels pressed together when the fastener is locked, the members 31 yielding to allow for imperfection of fit, warping or the like. The slant of said inclined slots 24 (Fig. 3) is steep enough to reduce to a minimum the component, in the direction of the slot, of the force of the pull of the hasp member on said upper parts 30 when the slide member is pulled upon when the hook is locked on the keeper lip, thereby to greatly reduce the force exerted on said upper parts, to allow the size and resistance of the spring wire to be small relative to said pull. The slant of said slots 24 is small enough to allow said pull and component to overcome the force of the spring wire and the friction of the bushing 26 on the ear in the slot while the force of the spring wire pulls the panels tightly together.

The operation of the fastener will be readily understood from the foregoing by those skilled in the fastener art. When the panels 10, 12 are assembled as shown in Fig. 1 and the butterfly 76 is raised to the position of Fig. 4 and there held by engagement of the tabs 90 with the faces 80 of the journals 74, the bolt 60 may be turned to place the pin 66 and the slide member 42 in the unlocked position of the lower part of Fig. 5, the slide member 42 and the hook 44 may be brought to the dotted line position on Fig. 1, after which the bolt 60 is turned to the position of the upper part of Fig. 5, drawing the hook 44 to the full line position of Fig. 1 thus holding the hook 44 in the position of Fig. 1, after which the butterfly 76 may be lowered to the position of Fig. 1 where it will be held by engagement of the tabs 90 with the faces 78 of the journals 74 of the butterfly.

I claim as my invention:

1. A fastener for fastening together structures having adjacent faces one of which carries a keeper secured thereon; said fastener comprising a bracket adapted to be mounted on the other panel and having parallel upturned side ears having alined apertures therein and slanting slots slanting upwardly and backwardly from said keeper; a stiff spring wire pivot member having a main part in said slots and having projecting end parts curved toward the ears and received in the apertures; relatively longitudinally slidable outer hasp and inner slide members adjacent to said faces, one member having a hook adapted to catch on the keeper, the other member being pivoted to said main part adjacent to the ears; and means carried by said members for drawing the members together.

2. A fastener as in claim 1, said spring member yieldably holding the structures pressed together when the fastener is locked and yielding to allow for imperfection of fit, warping or the like and drawing the structures closer together when possible; the slant of said inclined slots being steep enough to reduce to a minimum the component of force of the pull of the hasp member on said main part of the spring rod, in the direction of the slot when the slide member is pulled upon when the hook is locked on the keeper; thereby to greatly reduce the force exerted on said main part to allow the spring wire to be small relative to said pull; the slant of said slots being small enough to allow said pull and component to overcome the force of the spring rod and the friction of the rod on the ear in the slot.

3. A fastening device for fastening together a pair of structures one of which carries a keeper, said device comprising a pair of upturned ears adapted to be secured to the other structure and having slots extending rearwardly and upwardly from said keeper; a pivot rod in said slots; a hasp member pivoted on said rod and carrying means to pull upon and unlock from said keeper; and yieldable means to urge said rod to the upper part of the slots.

4. A fastening device for fastening together a pair of panels meeting in a butt-joint at a meeting face one of which has a keeper lip thereon; said device comprising a bracket adapted to be secured to one panel and having parallel upturned side ears having alined apertures disposed in the part of the ears nearest said panels and inclined slots radial to said apertures and extending from said apertures at an angle of about 30°–50° to the panels to the part of the ears most remote from the panels; a pivot rod in said slots having projecting spring end parts curved toward the ears and received in the apertures; alined relatively slidable outer hasp and inner slide members adjacent to said faces, one member having a hook adapted to catch on the keeper lip, the other member being pivoted on said main part; and means carried by said members and bolt for drawing the members together.

5. A fastener for securing together panels having adjacent faces one of which carries a keeper; said fastener comprising approximately alined relatively slidable upper hasp member and lower slider members, one member having a hook adapted to catch on the keeper; the other member being pivoted to the other panel; means for holding said members against relative transverse and rotary movement; said hasp member being provided with a large opening; said slide member having a transverse slot; a bolt in said opening having a flat inner end face engaging the slide face and an accentric pin fast in said bolt at said face and engaging in said transverse slot.

6. A fastener for securing together panels one of which carries a keeper, said fastener comprising alined relatively slidable outer hasp and inner slide members, one member having a hook adapted to catch on the keeper, the other member being pivoted to the other panel; a bolt passing through said members, means carried by said members and bolt for drawing the members together; said bolt having opposite diametric bores at the upper end; a butterfly having inturned pivot journals of square cross section in said bores; and a flat metal spring anchored across the upper end of the bolt and having projecting parts curved downwardly and inwardly and pressing against said journals.

7. A fastener for securing together adjacent panels, one of which carries a keeper lip secured thereon; said fastener comprising approximately alined relatively slidable outer hasp and inner slide members adjacent to said faces, one member having a hook adapted to catch on the keeper lip, the other member being pivoted to the other panel; a bolt passing through said hasp member and engaging the slide member; and means carried by said slide member and bolt for drawing the members together; said bolt having opposite diametric bores at the upper end; a butterfly having inturned pivot journals of square cross section in said bores; the outer end face of the bolt being provided with a deep intramarginal recess; and a disk of spring metal anchored in said recess and having projecting tabs curved downwardly and inwardly and pressing against said journals; said flat end face of the bolt having a recess; and a spring on said slide member provided with a protuberance engageable in said recess.

8. A fastener for securing together panels having adjacent faces one of which carries a keeper; said fastener comprising approximately alined relatively slidable upper hasp member and lower slide members one member having a hook adapted to catch on the keeper; the other member being pivoted to the other panel; means for holding said member against relative transverse and rotary movement; said hasp member being provided with a large opening; said slide member having a transverse slot; a bolt in said opening having a flat inner end face engaging the slide face; an eccentric pin fast in said bolt at said face and engaging in said transverse slot; said flat end face of the bolt having a recess; and a spring on said slide member provided with a protuberance engageable in said recess.

9. A fastener for securing together panels having adjacent faces one of which carries a keeper; said fastener comprising approximately alined relatively slidable upper hasp member and lower slide members one member having a hook adapted to catch on the keeper; the other member being provided to the other panel; means for holding said members, against relative transverse and rotary movement; said hasp member being provided with a large opening; said slide member having a transverse slot; a bolt in said opening having a flat inner end face engaging the slide face; an eccentric pin fast in said bolt at said face and engaging in said transverse slot; and said slide member being provided with a U-shaped cut having its yoke part adjacent to said opening of the member and provided with a protuberance; said flat end face of the bolt having a recess near its periphery receiving said protuberance when in locking position to yieldably stop the bolt.

10. A fastening device for fastening together a pair of panels one of which has a keeper thereon; a pair of ears adapted to be secured to the other panel and having alined apertures at the part most adjacent to the other panel and upwardly backwardly inclined slots to the rear of the apertures; a sleeve disposed normally in the upper part of said slots transversely of the ears; and a pair of stiff spring wire pivot members, each having an upper part received in said sleeve and extending substantially to the middle of the sleeve; and a projecting part exterior to the space between the ears and curved in a convolution and having an inwardly extended lower part extending inwardly through said aperture and having its free inner end part disposed in the space between the ears and bent at an angle to hold the upper and lower parts against outer movement from said sleeve and aperture; a rod in said slots and having spring end parts in the apertures; adjacent panels one of which carries a keeper lip, relatively slidable outer hasp and inner slide members adjacent one member having a hook adapted to catch on the keeper lip, the other member being pivoted on said sleeve; and means carried by said outer member for drawing the members together.

References Cited in the file of this patent

UNITED STATES PATENTS

| | | |
|---|---|---|
| 83,983 | Marvin | Nov. 10, 1868 |
| 212,431 | Benson | Feb. 18, 1879 |
| 1,030,073 | Gibbs | June 18, 1912 |
| 1,283,037 | Baltzley | Oct. 29, 1918 |
| 1,369,699 | Myers | Feb. 22, 1921 |
| 1,381,733 | O'Connor | June 14, 1921 |
| 1,469,196 | Strange | Sept. 25, 1923 |
| 1,682,060 | Banks | Aug. 28, 1928 |
| 2,001,216 | Sand | May 14, 1933 |
| 2,018,191 | Schmidt | Oct. 22, 1935 |
| 2,378,654 | Pekny | June 19, 1945 |
| 2,647,287 | Jones | Aug. 4, 1953 |
| 2,741,341 | Anderson | Apr. 10, 1956 |

FOREIGN PATENTS

| | | |
|---|---|---|
| 740,930 | France | Feb. 3, 1933 |